United States Patent [19]

Nishizawa

[11] Patent Number: 5,987,228
[45] Date of Patent: Nov. 16, 1999

[54] NETWORK PRINTING APPARATUS FOR MULTIPLE PROTOCOLS

[75] Inventor: Takeshi Nishizawa, Kanagawa, Japan

[73] Assignee: Fuji Xerox Co., Ltd, Tokyo, Japan

[21] Appl. No.: 08/824,868

[22] Filed: Mar. 26, 1997

[30] Foreign Application Priority Data

Mar. 27, 1996 [JP] Japan ................................. 8-071835

[51] Int. Cl.[6] .................................................. G06F 15/00
[52] U.S. Cl. ......................................................... 395/114
[58] Field of Search ..................................... 395/101, 106,
395/109, 111, 112, 113, 114, 117, 186,
527, 200.3, 200.31, 200.32, 200.37, 200.47,
200.49, 200.5, 200.79; 707/9, 10, 104,
500

[56] References Cited

U.S. PATENT DOCUMENTS

| | | | |
|---|---|---|---|
| 5,513,210 | 4/1996 | Voon et al. ............................. | 375/202 |
| 5,636,333 | 6/1997 | Davidson, Jr. et al. ................ | 395/114 |
| 5,675,782 | 10/1997 | Montague et al. .......................... | 707/9 |
| 5,689,625 | 11/1997 | Austin et al. ............................. | 395/114 |
| 5,689,642 | 11/1997 | Harkins et al. ..................... | 395/200.37 |
| 5,727,135 | 3/1998 | Webb et al. ............................ | 395/113 |
| 5,754,747 | 5/1998 | Reilly et al. ............................ | 395/114 |
| 5,761,669 | 6/1998 | Montague et al. ...................... | 707/103 |

FOREIGN PATENT DOCUMENTS 6-348436 12/1994 Japan .
7-104955 4/1995 Japan .

Primary Examiner—Scott Rogers
Assistant Examiner—Gabriel I. Garcia
Attorney, Agent, or Firm—Finnegan, Henderson, Farabow, Garrett & Dunner, L.L.P.

[57] ABSTRACT

In a network printing apparatus, a job receiving unit receives a print request, and a name/name-identifier acquiring unit acquires the name of a print request issuer, a protocol, and a name identifier for identifying the request issuer from the print request received by the job receiving unit. A name-identifier judging unit refers to an access control table, and judges whether or not the name identifier obtained from the print request is coincident with that in the access control table. A name determining unit refers to the same table, and judges whether or not the name obtained from the print request is coincident with that in the table. If the name identifiers are coincident with each other and the names are also coincident with each other, a right determining unit determines the right necessary for carrying out the print request process for the print request issuer, on the basis of a kind of access in the entry associated with the name of the print request issuer in the access control table, and allows the request issuer to access the network printing apparatus by its right. When a group identifier is registered in the access control table, the name determining unit judges whether or not the request issuer belongs to the group in a specified manner.

3 Claims, 4 Drawing Sheets

FIG. 3

| NAME IDENTIFIER | NAME | KIND OF ACCESS | GROUP IDENTIFIER |
|---|---|---|---|
| NA | TARO | READ | |
| NB | ADMIN | READ/WRITE | ✓ |
| ⋮ | ⋮ | ⋮ | ⋮ |

FIG. 4

| NAME IDENTIFIER | NAME-LOCATION DETERMINING MEANS |
|---|---|
| NA | MEANS A |
| NB | MEANS B |
| ⋮ | ⋮ | ly # NETWORK PRINTING APPARATUS FOR MULTIPLE PROTOCOLS

BACKGROUND OF THE INVENTION

1. Field of the Invention

The present invention relates to a network printing apparatus and, more particularly to a network printing apparatus for processing print requests transmitted according to a plurality of protocols.

2. Description of the Related Art

For an access control system in a conventional network printing apparatus, the network printing apparatus discriminates a specific user or host computer, and an access system is limited every user or host computer.

An example of the network printing apparatus is disclosed in Japanese Patent Unexamined Publication No. Hei. 7-104955. In the publication, information for discriminating host computers is registered in advance in the printing apparatus. The apparatus compares the output information received thereby with the registered discriminating information to judge whether or not the host computer is registered. The apparatus processes or casts the received output information on the basis of the result of the judgement. That is, the access control is carried out in this way.

A remote printing system is disclosed in Japanese Patent Unexamined Publication No. Hei. 6-349436. In the printing system, information for identifying users is registered in advance in a table. When an issuer of a print request received is contained in the table, the print request is processed.

However, those conventional techniques are adaptable for only a case where a print request issued according to a specific protocol is processed, and can not be applied to a system which processes print requests issued according to different protocols.

SUMMARY OF THE INVENTION

Accordingly, an object of the present invention is to provide a network printing apparatus which can process print requests issued according to different protocols.

To achieve the above object, there is provided a network printing apparatus for processing print requests transmitted in a plurality of protocols comprising: job receiving means for receiving print requests being transmitted from host computers according to protocols of the host computers; name/name-identifier acquiring means for acquiring a name of a print request issuer and a name identifier from the print request received by the job receiving means; an access control table for managing a relationship among a name of a print request issuer, a name identifier, and a kind of access; name-identifier judging means for judging whether or not the name identifier acquired by the name/name-identifier acquiring means is registered in the access control table by comparing the acquired name identifier with the name identifiers in the access control table, the name-identifier judging means rejecting the print request when the acquired name identifier is not registered in the access control table; name determining means operating such that when the name-identifier judging means determines that the name identifier is registered in the access control table, the name determining means compares the name of the print request issuer acquired by the name/name-identifier acquiring means with the names registered in the access control table to judge whether or not the print request issuer is registered in the access control table, and when the print request issuer is not registered, the name determining means rejects the print request; and right determining means operating such that when the name determining means determines that the print request issuer is registered in the access control table, the right determining means determines right necessary for carrying out the print request process for the print request issuer, on the basis of a kind of access in an entry associated with the name of the print request issuer in the access control table, and allows the print request issuer to access the network printing apparatus by the right.

BRIEF DESCRIPTION OF THE DRAWINGS

FIG. 3 is a diagram showing an example of an access control table in the print server of FIG. 2;

FIG. 4 is a diagram showing an example of a name-location determining means table in the print server.

DETAILED DESCRIPTION OF THE PREFERRED EMBODIMENT

Figure 1:
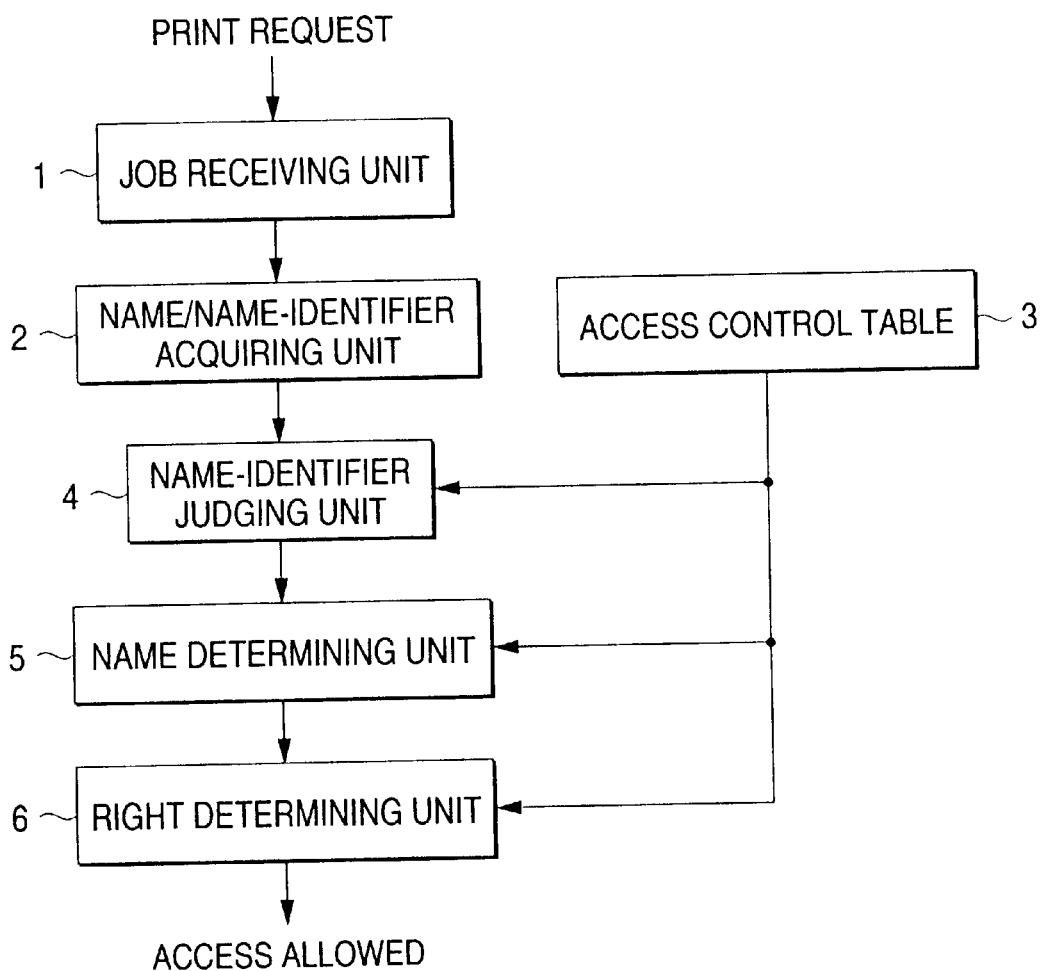
FIG. 1 is a block diagram showing the principle of a network printing apparatus according to the present invention.

The principle of a network printing apparatus according to the present invention will be described with reference to FIG. 1.

A network printing apparatus of the present invention comprises a job receiving unit 1 for receiving print requests, a name/name-identifier acquiring unit 2, an access control table 3, a name-identifier judging unit 4, a name determining unit 5, and a right determining unit 6. The job receiving unit 1 includes a protocol converting device for converting a plurality of protocols, which are employed in a plurality of host computers connected to a network, into a specific protocol, and receives and accepts print requests transmitted according to different protocols. The name/name-identifier acquiring unit 2 receives a print request from the job receiving unit 1, and acquires the name and protocol of a print request issuer, and a name identifier for identifying the print request issuer from the received print request. The access control table 3 contains print request issuer names, name identifiers, kinds of access, and group identifiers. The name-identifier judging unit 4 refers to the access control table 3, and judges whether or not the name identifier acquired by the name/name-identifier acquiring unit 2 is coincident with one of the name identifiers in the access control table 3. When the acquired name identifier in not coincident with one of the name identifiers in the access control table 3, the print request is rejected. The name determining unit 5 compares the name of a print request issuer acquired by the name/name-identifier acquiring unit 2 with the names registered in the access control table 3 to judge whether or not those names are coincident with each other. If the names are not coincident, the print request is rejected. When a group identifier in registered in the entry of the access control table 3 corresponding to the name identifier, an object who makes an access allowed by the entry in a group of persons. Then, it is judged that the name in the access control table 3 is a group name. The name determining unit 5 requests the name-location determining means which determines the name of the print request issuer to determine whether or not the print request issuer belongs to the group. Here, if the print request issuer is not determined, the print request is rejected. After the name of the print request issuer is determined, the right determining unit 6 determines the right necessary for carrying out the print request process for the print request issuer, on the basis of a kind of access in the entry associated with the name of the print request issuer in the access control table, and allows the print request issuer to access the network printing apparatus by its right.

In the present invention, to discriminate the print request issuers of different protocols, the "name identifier" is introduced into the access control table 3. The name-identifier judging unit 4 compares the received print request issuer with that in the access control table, and the name determining unit 5 requests the means, which is for determining the name of the print request issuer associated with each name identifier, to determine whether or not the print request issuer belongs to a group, whereby an access control capable of processing print requests issued according to different protocols is realized.

The network printing apparatus, which can process print requests issued according to a plurality of protocols, interprets users of a plurality of protocols, and groups and can perform an access control every user or group, and can accept print requests that are transmitted according to the plurality of protocols.

The preferred embodiment of the present invention will be described. In the embodiment, the invention is applied to a print server.

Figure 2:
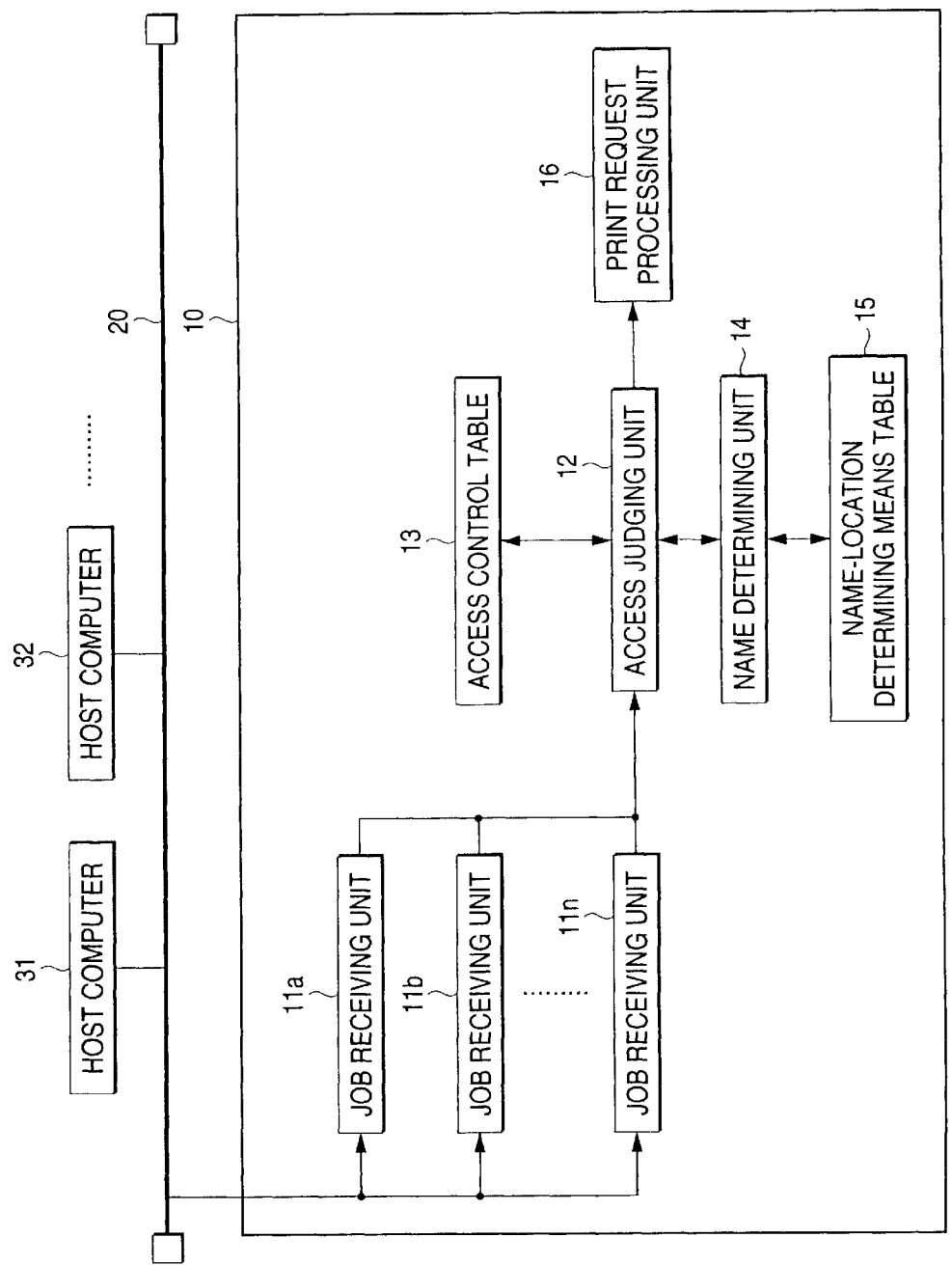
FIG. 2 is a block diagram showing an arrangement of a printer server.

FIG. 2 is a block diagram showing an arrangement of a print server.

In the figure, a print server 10 is connected to a plurality of host computers (clients) 31, 32, ... through a network 20. The print server 10 comprises a plurality of job receiving units 11a, 11b, ... 11n, an access judging unit 12, an access control table 13, a name determining unit 14, a name-location determining means table 15, and a print-request processing unit 16.

The contents of print requests issued from the host computers 31, 32, ... are different every protocol. In a protocol A, a print request contains, for example, "name of a print request issuer", "name identifier", "type of request", and "data". In a protocol B, a print request contains, for example, "name of a print request issuer", "type of request", and "data".

In the print server 10, the job receiving units 11a, 11b, ... 11n are provided corresponding in number to the protocols used by the host computers. Each of the job receiving units 11a, 11b, ... 11n includes a protocol converting device for converting the protocol of a received print request into a protocol that is accepted by the print server 10. In this instance, the print server 10 is designed so as to process a print request issued according to the protocol A, and a protocol converting device is not included in the job receiving unit 11a. Therefore, the job receiving unit accepts the print request transmitted according to the protocol A, without any protocol conversion. If the job receiving unit 11b receives a print request that is transmitted according to the protocol B, it checks the contents of the request and converts the print request based on the protocol B into a print request based on the protocol A by its protocol converting device. As a result, the print request based on the protocol B is accepted. This protocol converting process is to supplement the contents of the protocol B basis print request with the "name identifier", which is not contained in the contents of the protocol B basis print request. In this instance, a proper name identifier capable of identifying the request issuer of the protocol B basis print request is added to the contents of the protocol B basis print request. In this way, a print request issued by a user is received by any one of the job receiving units 11a, 11b, ... 11n, and a protocol converting process is carried out if necessary, and sent to the access judging unit 12.

The access judging unit 12 judges whether or not an issuer of a print request satisfies the requirements of the right necessary for the request processing. In this instance, the access judging unit 12 acquires the name of the issuer and a name identifier from the print request. Then, the access judging unit 12 refers to the access control table 13 and searches the table for the name identifier obtained from the print request. Specifically, the access judging unit 12 successively compares the name identifiers contained in the table with the name identifier of the print request. If the name identifier, which is coincident with the name identifier of the print request, is not contained in the table, the print request is rejected here. If the name identifier, which is coincident with the name identifier of the print request, is contained in the table, the access judging unit 12 refers to the access control table 13 and determines whether the name of the issuer is a group name or a user name. If the issuer name is not a group name, the access judging unit 12 successively compares the names in the entry containing the name identifier in the table 13 with the issuer name obtained from the print request. If the name, which is coincident with the issuer name of print request, is not found in the table, the print request is rejected. If the issuer name registered in the access control table 13 is the group name, the access judging unit 12 inquires of the name determining unit 14 whether or not the issuer name obtained from the print request belongs to the group. In other words, the name determining unit 14 refers to the name-location determining means table 15 to determine as to whether or not the name identifier is registered in the table. If it is registered, the name determining unit 14 searches the name-location determining means that is registered in association with the name identifier. Further, it requests the name-location determining means to take the matching of the names. Specifically, the name determining unit 14 inquires of an external name managing server in which the issuer is registered as a member whether or not the issuers are coincident with each other. If the issuers are not coincident, the print request is rejected. When the issuers are coincident and the user identifying process ends, then the access judging unit 12 determines the type of the right necessary for processing the print request. That is, the access judging unit 12 refers to the access control table 13 and determines the right of access that is contained in the kind of access in the entry containing the name identifier. After the user identifying process and the access right determining process are completed, the print request is transferred to the print-request processing unit 16. The print-request processing unit 16 actually carries out the requested process by the right determined by the access judging unit 12.

FIG. 3 shows an example of the access control table 13.

The access control table 13 is a table describing who are allowed to make what kind of access. As shown, the access control table 13 contains "name identifier" indicating protocols and users, "name" indicating the names of users or groups, "kind of access" indicating kinds of allowed requests, and "group identifier" indicating flags for indicating whether the name is the user name or the group name. The values of those entries are determined when the print server 10 is installed or by a manager.

In the fist entry of this table, a user "Taro" issued a print request that is transmitted according to the protocol A. A kind of access allowed for the print request issued according to the protocol A is also registered in the table. A name identifier NA for identifying the protocol A basis request issuer is registered in the column "name identifier". In the second entry, a kind of access is registered which is allowed for a print request issued according to the protocol B. The print request is issued by a user who belongs to a group "Admin". The protocol B basis print request is converted into a protocol A basis print request in the job receiving unit 11b. The "name identifier" is filled with a name identifier NB for identifying a protocol B basis request issuer, who is different from the protocol A basis request issuer.

Of those columns in the access control table 13, the column "name identifier" is first referred to by the access judging unit 12. If the name identifier obtained from the received print request is coincident with the name identifier in the table, the access judging unit 12 refers to the column "group identifier", and judges as to whether a flag is set. If a flag is not set in the "group identifier", the access judging unit 12 refers to the "name" and identifies its user. If a flag is set, the access judging unit 12 determines that the "name" is the group name, and searches the group for the user and identifies the user. After identifying the user, the access judging unit 12 refers to the column "kind of access".

FIG. 4 is an example of the name-location determining means table in the print server.

The name-location determining means table 15 contains "name identifier" and "name-location determining means". The name-location determining means table 15 describes where to identify the user. If a flag is set in the "group identifier" in the access control table 13, the print server 10 cannot identify the user. In this case, the table 15 is used. The name of the name managing server on the network, a procedure of verifying the name, and the like are registered in the "name-location determining means". If a flag is set in the column of "group identifier" in the entry containing the "name identifier" in the access control table 13 (e.g., NB of the "name identifier" in the table 13), the print server refers to the table 15 and requests a means B, e.g., a name managing server, associated with the name identifier NB to identify the user.

Figure 5:
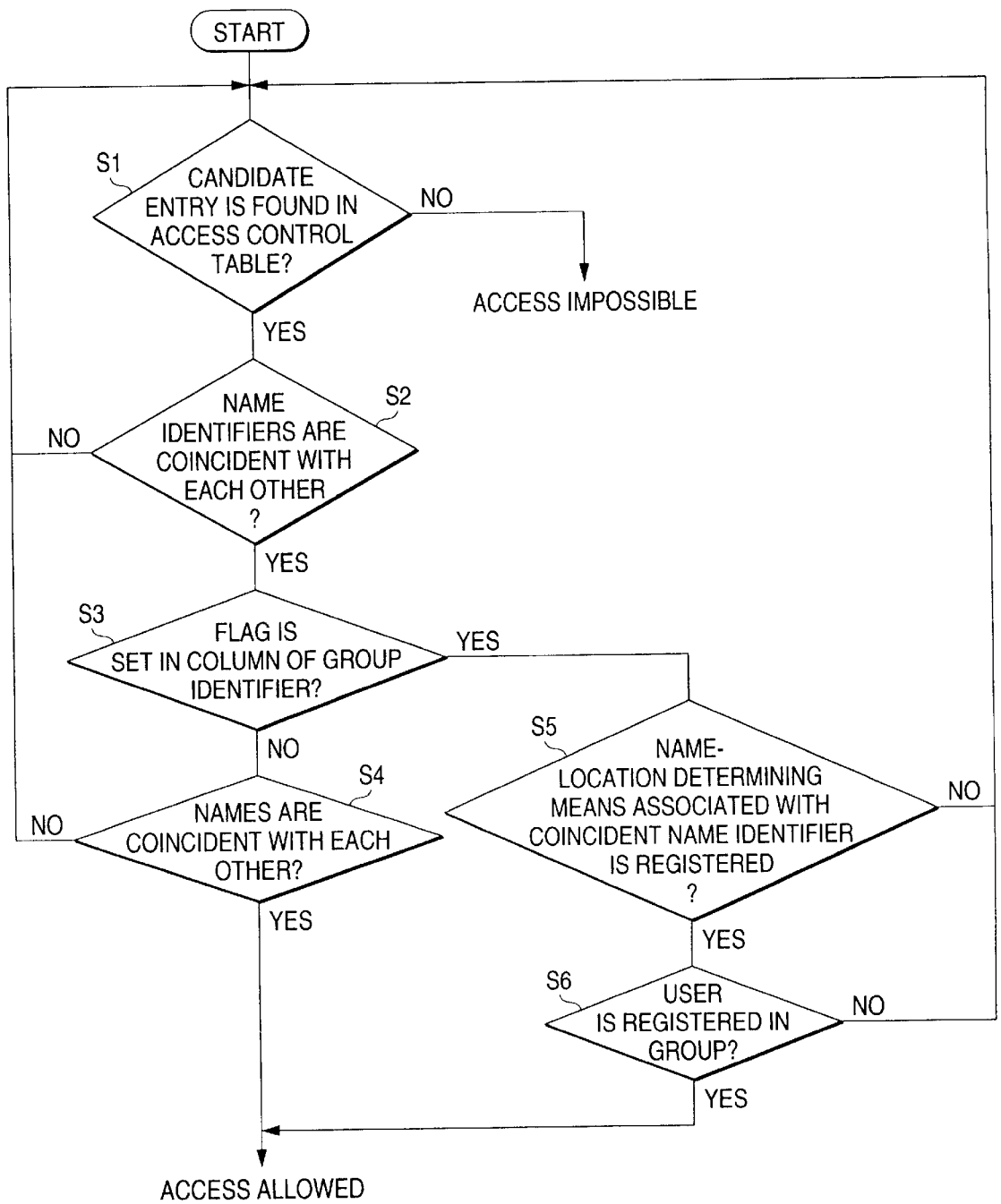
FIG. 5 is a flow chart showing a flow of an access control judging process in the print server.

FIG. 5 is a flow chart showing a flow of an access control judging process in the print server.

A print request is first transferred to the access judging unit 12. Upon receipt of the print request, the access judging unit 12 successively looks over the entries in the access control table 13. If failing to find a candidate entry, the access judging unit 12 determines that an access is impossible (step S1). If succeeding in finding the candidate entry, the access judging unit 12 acquires a name identifier for identifying a user of a specific protocol from the print request, and compares it with the name identifier in the entry to determine whether or not those name identifiers are coincident with each other (step S2). If they are not coincident with each other, the access judging unit 12 searches the next entry in the access control table 13. If the name identifier of the print request is coincident with that in the searched entry, the access judging unit 12 judges whether or not a flag is set in the column of the group identifier (step S3). If a flag is not set therein, the access judging unit 12 judges whether or not the name of a print request issuer that is contained in the print request is coincident with the name in the access control table 13 (step S4). If those names are coincident with each other, the access judging unit 12 determines that an access is allowed. If those names are not coincident, the access judging unit 12 returns to step S1 where it searches the next entry in the access control table 13.

In step S3, if a flag is set in the column of the group identifier, the name determining unit 14 searches the name-location determining means table 15 for determining whether or not a name-location determining means associated with the coincident name identifier is registered in the table 15 (step S5). If it is not registered therein, the access judging unit 12 searches the next entry in the access control table 13. If it is registered, the print server requests a name managing server, which is registered as a name-location determining means, to determine whether or not the user is registered as a member in the group (step S6). If it is registered, the print server determines that an access is allowed. If it is not registered, the print server searches the next entry.

If an access is allowed, then the access judging unit 12 judges whether or not a kind of the access allowed for the print request is registered in the column of the kind of access in the entry. If it is not registered, a substantial print request process is not executed and the print request is rejected. If an access right necessary for the print request process is registered, the print request is transferred to the print-request processing unit 16 where the print request process is actually carried out.

As seen from the foregoing description, in the network printing apparatus of the present invention, the name identifiers for identifying the request issuers are added to the contents of the access control table. Therefore, a request issuer can be identified every protocol. Further, the judgement as to whether or not a user belongs to a group is processed by a means associated with the name identifier. The network printing apparatus characterized as just mentioned can interprets users of a plurality of protocols, and groups and can perform an access control every user or group, and can accept print requests that are transmitted according to the plurality of protocols.

What is claimed is:

1. A network printing apparatus for processing print requests transmitted in a plurality of protocols, comprising:

a plurality of job receiving means for receiving print requests in a plurality of protocols, wherein each print request is transmitted from one of a plurality of host computers according to one of the plurality of protocols;

name/name identifier acquiring means for acquiring a name of a print request issuer and a name identifier from the print request received by said job receiving means;

an access control table for managing a relationship among a name of a print request issuer, a name identifier, and a kind of access;

name-identifier judging means for judging whether or not the name identifier acquired by said name/name identifier acquiring means is registered in said access control table by comparing the acquired name identifier with the name identifiers in said access control table, said name-identifier judging means rejecting the print request when the acquired name identifier is not registered in said access control table;

name determining means operating such that when said name-identifier judging means determines that the name-identifier is registered in said access control table, said name determining means compares the name of the print request acquired by said name/name-identifier acquiring means with the names registered in said access control table to judge whether or nor the print request issuer is registered in said access control table, and when the print request issuer is not registered, said name determining means rejects the print request; and right determining means operating such that when said name determining means determines that the print request issuer is registered in said access control table, said right determining means determines right necessary for carrying out the print request process for the print request issuer, on the basis of a kind of access in an entry associated with the name of the print request issuer in said access control table, and allows the print request issuer to access said network printing apparatus by the right.

2. The network printing apparatus according to claim 1, wherein each entry of said access control table contains a group identifier indicating whether an object who makes an access allowed by the entry is a person or a group of persons, and said name determining means contains name-location determining means operating such that when the group identifier in each entry of said access control table, which is associated with the name identifier acquired by said name/name-identifier acquiring means, indicates a group of persons, said name-location determining means determines a group to which the print request issuer belongs.

3. The network printing apparatus according to claim 2, wherein said name-location determining means is provided while being related to means for determining that the print request issuer belongs to a group on the basis of the name of the print request issuer and the name identifier acquired by said name/name-identifier acquiring means.

* * * * *